United States Patent [19]
Beaman et al.

[11] Patent Number: 6,091,505
[45] Date of Patent: Jul. 18, 2000

[54] METHOD AND SYSTEM FOR ACHIEVING ENHANCED GLYPHS IN A FONT

[75] Inventors: Alexander B. Beaman, San Jose; David G. Opstad, Mountain View, both of Calif.

[73] Assignee: Apple Computer, Inc., Cupertino, Calif.

[21] Appl. No.: 09/016,671

[22] Filed: Jan. 30, 1998

[51] Int. Cl.[7] .................................................. G06K 15/00
[52] U.S. Cl. ........................................ 358/1.11; 358/1.2
[58] Field of Search ..................... 358/1.2, 1.11, 358/1.13, 470; 345/467, 468, 144, 470, 471, 472, 127, 128, 131; 707/542, 529

[56] References Cited

U.S. PATENT DOCUMENTS 5,715,473  2/1998  Reed ....................................... 358/805

*Primary Examiner*—Arthur G. Evans
*Attorney, Agent, or Firm*—Sawyer Law Group LLP

[57] ABSTRACT

Aspects for achieving enhanced glyphs of a font are presented. In a method aspect, the method includes determining a glyph layer description for a selected glyph, and accessing at least one contour for the selected glyph. The method further includes accessing at least one layer style for the at least one contour of the selected glyph, and rendering the selected glyph in accordance with the at least one layer style to produced an enhanced glyph. In a system aspect, the system includes a mechanism for providing a hinted path. A glyph layer processor is coupled to the mechanism for providing and receives the hinted path. The glyph layer processor outputs enhanced glyph data. A drawing client for receiving the enhanced glyph data from the glyph layer processor for output from a computer system is further included.

40 Claims, 3 Drawing Sheets

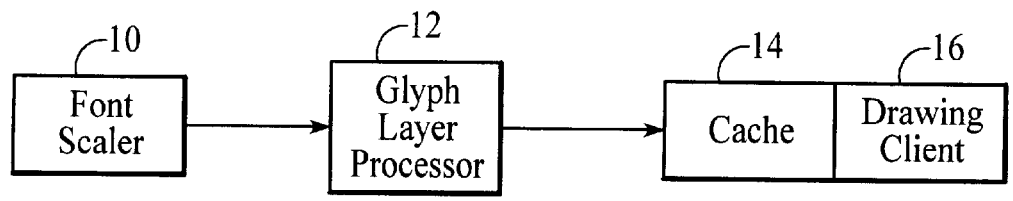
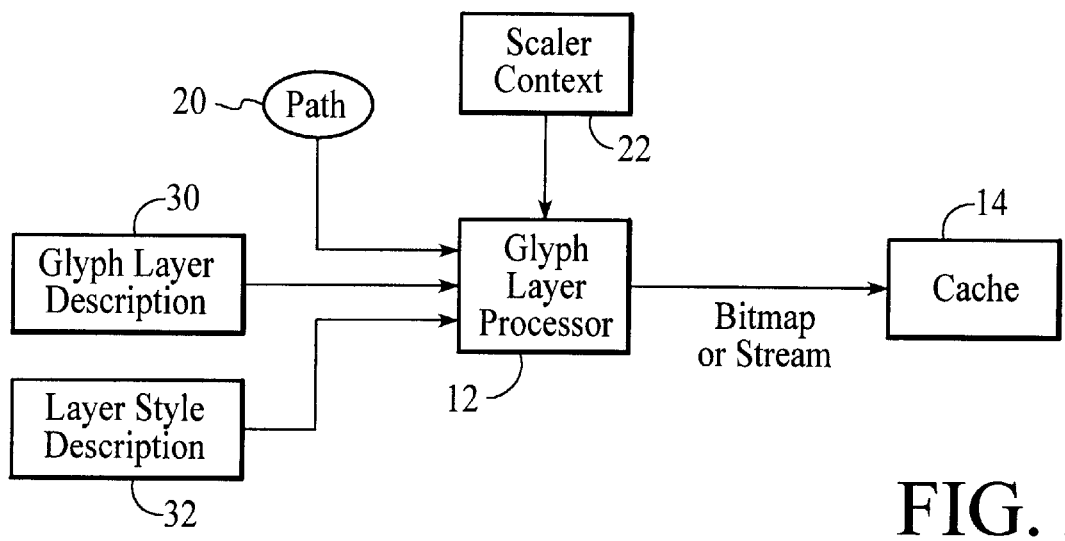
FIG. 1
FIG. 2
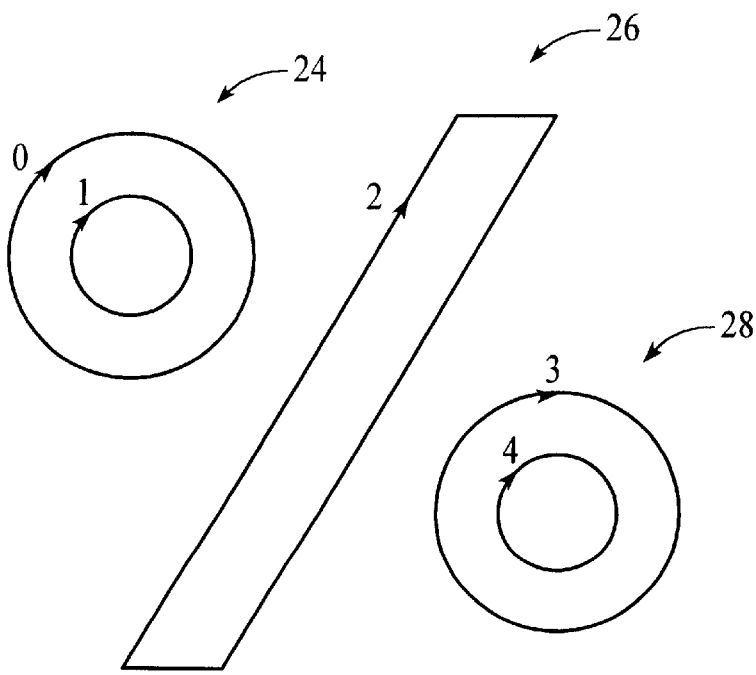
FIG. 3

METHOD AND SYSTEM FOR ACHIEVING ENHANCED GLYPHS IN A FONT

FIELD OF THE INVENTION

The present invention generally relates to graphical character representation, and more particularly relates to providing enhancements to glyphs within a font.

BACKGROUND OF THE INVENTION

Current computer systems provide individuals with opportunities to produce documents of professional quality, such as with desktop publishing software and graphics software programs. The ability to manipulate the appearance of the text within these programs is vital in allowing users greater flexibility and creativity in document production. Included in these manipulations are changes in fonts, justification, size, and other aspects of the appearance, such as bolding and italicizing.

Although most programs can perform manipulations with some level of success, each program has a limitation in its range of manipulations due to design considerations. Some programs, such as QuickDraw GX from Apple Computer, Inc., Cupertino, Calif., provide more sophistication and enhanced capabilities than other programs to allow more choices for users. Unfortunately, these enhanced capabilities are normally not transferable to other programs. Thus, attempts to incorporate such capabilities, such as different fonts, from one program into another are also usually quite limited and typically unsuccessful.

Further, current graphics and multimedia technology has advanced to a level where text is becoming a larger component in colorful, and sometimes animated, presentations. For example, the multitude of World Wide Web sites has resulted in a variety of efforts to create more attractive and distinguishing web pages for users. While tools, such as graphics programs, provide capabilities to create and manipulate more colorful text displays, such as to have some highlighting effect or interesting fill pattern, the quality of appearance often suffers, especially when the graphics-created text is used in a traditional text environment, e.g., in a headline. Since characters are often converted to geometric shapes to achieve these effects, they cease to be 'text', per se.

Further, text displays produced in a graphics program usually are produced as bitmaps and are limited to scaling among a few predetermined sizes. Changing scale among these sizes presents problems, since distortion of the original display of the item often occurs. Scalable fonts that attempt to combat such problems for text apply intelligence, i.e., 'hints', that change the outline shape of an item, so that as the size of the item is reduced to smaller and smaller point sizes, the outline shape is still distinguishable, i.e., the quality of the item is controlled. An example of such a scalable font technology is the TrueType font format from Apple Computer, Inc.

Colored text itself has been available in systems with graphical user interfaces for some time. Normally, changes in color are limited to alterations in a single foreground color for a character's graphical representation or glyph image, being placed over a background color, such as changing text from black on white to yellow on green. Alternatively, the actual drawing of a glyph image can be modified by a transfer mode, which controls how the image pixels being drawn interact with the image pixels already present on the background, e.g., to control the transparency of the glyph. Any color applied is done by the drawing process with a 1-bit deep bitmap/common outline used as the raw material for the drawing of the glyph. However, the color information is not a part of the glyph and each character is limited to a single color. While bitmap fonts may have characters with multiple colors, these bitmaps have limited legibility when scaled.

Accordingly, a need exists for a flexible system that provides enhancement features, such as color features, and information intrinsically for font glyphs. The present invention addresses such a need.

SUMMARY OF THE INVENTION

Aspects for achieving enhanced glyphs of a font are presented. In a method aspect, the method includes determining a glyph layer description for a selected glyph, and accessing at least one contour for the selected glyph. The method further includes accessing at least one layer style for the at least one contour of the selected glyph, and rendering the selected glyph in accordance with the at least one layer style to produced an enhanced glyph.

In a system aspect, the system includes a mechanism for providing a hinted path. A glyph layer processor is coupled to the mechanism for providing and receives the hinted path. The glyph layer processor outputs enhanced glyph data. A drawing client for receiving the enhanced glyph data from the glyph layer processor for output from a computer system is further included.

With the present invention, resolution-independent, hinted graphical images with multiple colors and graphical effects are readily achieved. Further, the present invention permits simple animation on the images, as well. These and other advantages of the aspects of the present invention will be more fully understood in conjunction with the following detailed description and accompanying drawings.

BRIEF DESCRIPTION OF THE DRAWINGS

FIG. 1 illustrates a block diagram of an enhanced font processing system in accordance with the present invention.

FIG. 2 illustrates the glyph layer processor of FIG. 1 more particularly.

FIG. 3 illustrates an example of a percent sign glyph.

DETAILED DESCRIPTION

Figures 4A, 4B:
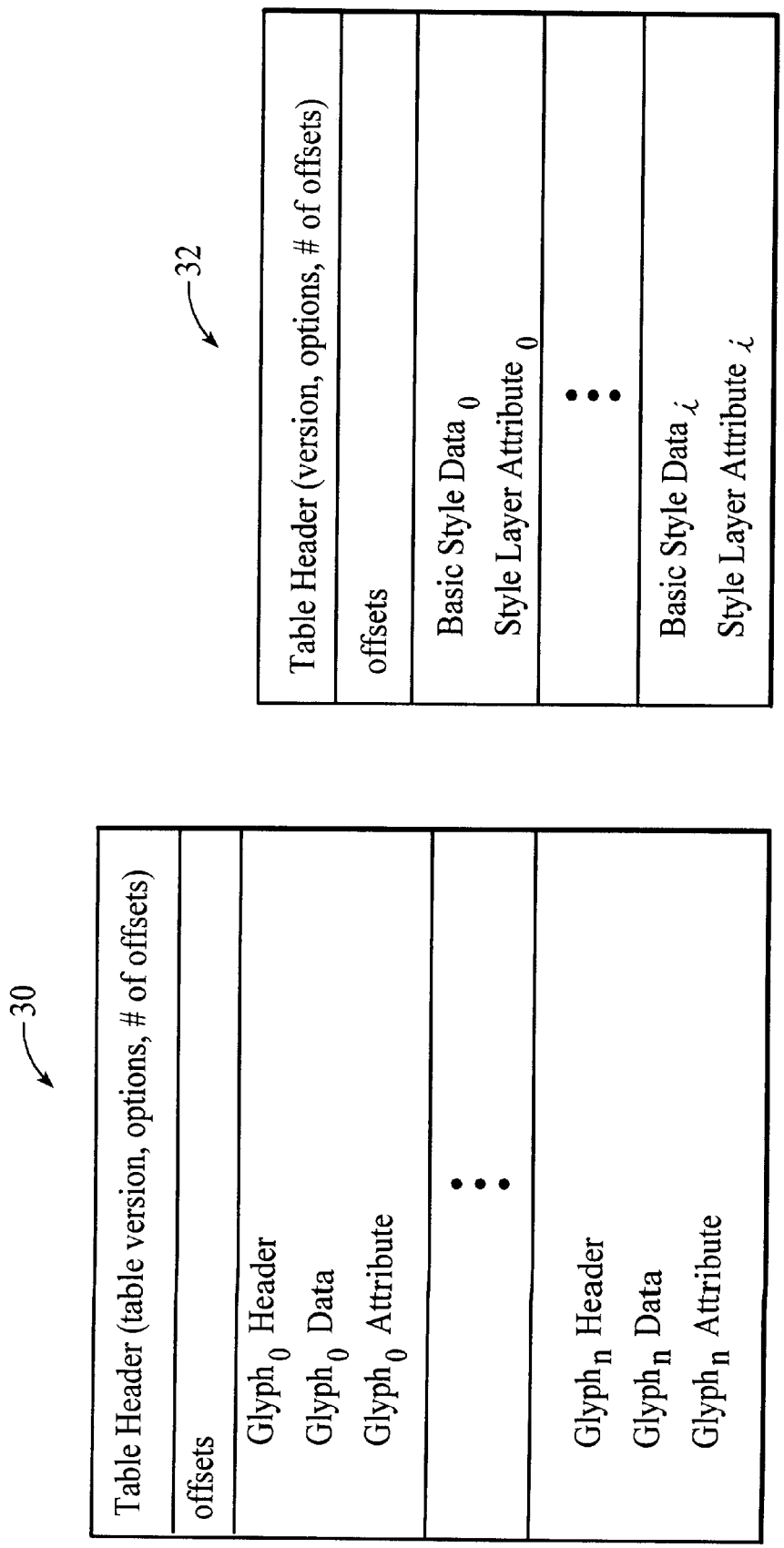
FIG. 4a illustrates a glyph layer description of FIG. 2 more particularly.
FIG. 4b illustrates a layer style description of FIG. 2 more particularly.

The present invention relates to enhancing font glyphs in a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art.

In order to more fully describe the present invention, some definitions for the terminology used herein is now provided. Text refers to words of something written or printed. Characters are abstract objects having a single and unique semantic or phonetic meaning. Glyphs, as opposed to characters, represents the visual, graphical appearance of a character. The particular representation of a character by a glyph is done in the context of the font, the font being a collection of glyphs which typically have an element of design consistency in their appearance.

FIG. 1 illustrates an overall block diagram of a colorful font processing system within a computer processing system, such as one of the family of Apple Macintosh computers, in accordance with the present invention. A font scaler 10 suitably handles the interpretation of data within a given font file, e.g., a TrueType font scaler. It should be appreciated that the term font scaler as used herein refers to a mechanism capable of providing a hinted path for glyph formation. Glyph information provided by the font scaler is suitably passed to a glyph layer processor 12. The glyph layer processor, GLP, 12 suitably performs manipulation of glyph data to achieve any specified enhancements, e.g., coloring effects, as described in more detail hereinbelow with reference to FIG. 2. The rendered data from the GLP 12 may be fed to a cache 14 accessible to a drawing client 16. By way of example, drawing clients 16 suitably include graphics systems, such as Quickdraw GX, printer drivers, and glyph servers. An example of a glyph server is suitably provided in co-pending U.S. patent application, Ser. No. 08/630,864, entitled "Method and Apparatus for Typographic Glyph Construction Including a Glyph Server", and assigned to the assignee of the present invention. Location of the GLP 12 is design dependent and may suitably be provided as a component of the font scaler 10 or an open font architecture (not shown), as is well understood by those skilled in the art.

Glyph information supplied from font scaler 10 suitably includes a path 20 and scaler context 22, as shown in FIG. 2. For purposes of this disclosure, a path preferably refers to contours which make up a given glyph and thus provide the dimensions of geometry for a glyph, while the scaler context 22 suitably refers to the matrix, point size, resolution, anti-aliasing, and hints determined by the font scaler for the given glyph. For a given glyph in a font, a geometry exists to describe the glyph, e.g., a quadratic path, cubics, page description language, etc., where a set of control points describe the geometry, and hints then operate on the points directly. Contours are formed by the points, with the points being defined as on or off a given curve. In an exemplary embodiment, the path from the font scaler 10 is provided by a TrueType scaler. However, it should be appreciated that the path could be provided from some other mechanism within a system that is capable of forming a hinted path to allow for preferred scaling functionality, as in the TrueType scaler.

In order to process glyph information and achieve enhanced/colorful fonts, the glyph layer processor 12 suitably treats a given glyph as a series of one or more layers, the layers comprising one, some, or all of the contours of a glyph, each layer being ordered for drawing one on top of another. By way of example, refer to FIG. 3, which illustrates an example of a percent sign glyph. As shown in FIG. 3, the percent sign glyph comprises three layers, 24, 26, and 28. Layer 24 comprises two contours, 0 and 1, while layer 26 comprises contour 2, and layer 28 comprises contours 3 and 4. Through the glyph layer processor 12 of the present invention, each of the layers of a glyph, e.g., 24, 26, and 28, are capable of being enhanced/ 'colorized'. By way of example, layer 24 could be made red, layer 26 could be made white, and layer 28 could be made blue.

Referring back to FIG. 2, glyph layer description 30 and layer style description 32 are also provided to achieve the enhanced individual layer processing by GLP 12. The data in the glyph layer description 30 and layer style description 32 are suitably added to a font to facilitate enhanced font functionality. In a preferred embodiment, the glyph layer description 30 and layer style description 32 are provided as separate data structures, the format providing an open-ended structure accessible and expandable to readily accommodate additional data as needed/desired in the future.

The glyph layer description 30 suitably provides the layering specifications for the glyphs in a font. Thus, the glyph layer description 30 presents the 'recipe' for a glyph, i.e., what layers exist for the glyph and how the layers relate to one another. Glyphs may share 'recipes', and thus, the data structure accommodates both one-to-one and many-to-one associations of glyphs and their layer descriptions.

The layer style description 32 houses the characteristics associated with the layer styles used by the 'recipes' in the glyph layer description 30. Suitably, the layer style description 32 is indexed, with the style index used in the glyph layer description 30. The index addresses style information in the layer style description 32 to achieve readily shared styles.

FIGS. 4a and 4b illustrate examples of data structures for the glyph layer description 30 and layer style description 32, respectively. As shown in FIG. 4a, the data structure for the glyph layer description 30 suitably includes a table header, with one header provided per table that indicates the table version, table options, and the number of offset entries. Further included is an offset entry with one entry per range of glyphs, where a range may contain shared or unique layer data offsets. For example, a chosen set of glyphs within a font may share a certain style, e.g., all punctuation glyphs are purple. The data structure further suitably includes a glyph header, whose location is suitably determined by offsets, which is the start of the recipe and that indicates the number of layers for the glyph and the number of optional attributes for the glyph. For example, for the percent sign glyph of FIG. 3, the indication of three layers for the glyph is suitably provided in the glyph header.

Glyph data then follows, e.g., $glyph_0$ to $glyph_n$, one set of glyph data provided per layer, with the length varying depending on the number of contours identified for the layer. Suitably, a style index value, the number of contours for the layer, and the contour numbers are provided in the glyph data. Contours are suitably referenced by a zero-based index into the hinted path for the glyph, with a chosen value suitably indicating 'use all contours' for the glyph. For example, for layer 24, a value for the style index for the color 'red' (in the layer style description 32) would be provided, a value of '2' for the number of contours, and the contour values of '0' and '1' would be provided. The glyph data is preferably provided in the order that each of the layers for the glyph are to be drawn.

The glyph layer description 30 suitably further includes glyph attribute group entries, which provide an indication of tag-length-value items for optional attributes that may be applied to an entire glyph. Attribute groups preferably refer to structured blocks of memory organized as tag plus value pairs where variable numbers of variable length tagged data items are held with the values retrieved by knowing the appropriate tags, as is well understood by those skilled in the art. By way of example, an optional programmed effect, such as an animation effect, could be indicated by a suitable tag, e.g., 'anim', to indicate that the glyph requires operation by an appropriate program resident in the computer system. Suitably, the attribute data associated with such a tag specifies the details of how the desired animation would occur.

The layer style description 32, as shown in FIG. 4b, suitably stores the table of characteristics associated with the layer styles, e.g., style$_0$ to style$_1$, used by the 'recipes' of the glyph layer description 30. The table suitably includes a style table header, one per table, that indicates the version, table options, and the number of style offsets. The offsets to the styles are then provided, with one offset per style, and which are suitably relative to the start of the table and presented in ascending order. An extra entry may also be included following the last entry for sizing, if needed.

Basic style data is then provided, one set of basic style data per style, which carries common settings. For example, the common settings include color, which is preferably device independent color, fill type, e.g., frame, winding, even-odd, etc., identification of whether the contours are stroked or filled, an alpha value, etc. A subsequent layer style attribute entry suitably provides an optional list of tag-length-value items, such as to indicate transfer mode, gradient ramp fill, foreground, background, client-supplied 'mycolor', and any other attributes, which may not as yet be standard or known, to form an extensible set of attributes and allow specific changes to a layer within a glyph. By way of example, other style indicators may be present if a user has changed the foreground color through some other style mechanism in a given program. The optional attributes entry would allow overriding of such selection, e.g., through a bit indicator, in situations where there should not be a change to a given style, such as when a specific company logo color is being used as the style, i.e., the client-supplied 'mycolor' data.

Referring again to FIG. 2, the GLP 12 suitably outputs the glyphs for rendering as bitmaps or streams to cache 14. The bitmap form of output suitably provides the data for copying on the screen, with the depth of the bitmap data varying as desired. Alternatively, the stream form of output suitably provides a more compact way of delivering the data for use by clients 16 (FIG. 1). The format of the stream preferably corresponds with a system known stream format, such as a curve codec stream of Quicktime 3.0 from Apple Computer, Inc., or a page description language stream format, e.g., a PostScript7 stream.

By way of example, a curve codec stream represents a data path stream which is described by a series of atoms. The atoms are meant to be traversed in the order in which they appear, with each data path drawn in turn. The style attributes for each path start with default values and take on new values as relevant atoms arrive in the stream. These new values affect all curves drawn from that point of the stream forward or until a new value is found in the stream. Suitably, color data is followed by fill data, which is followed by transfer mode, then by the path and the path data before an appropriate end of data indicator, e.g., a '0'.

Figure 5:
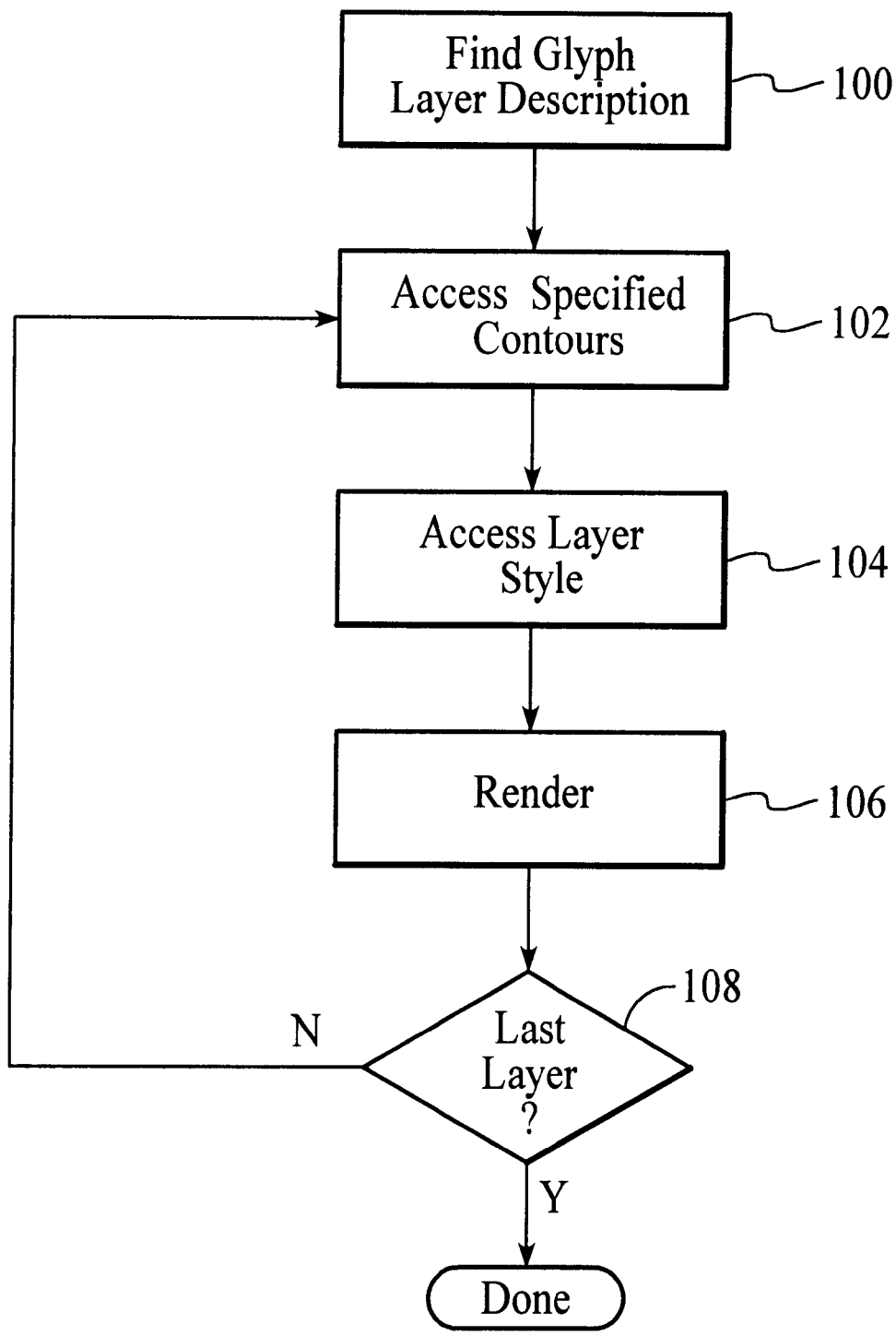
FIG. 5 illustrates a block flow diagram of processing for achieving enhanced glyphs in accordance with the present invention.

The overall process of achieving data output from GLP 12 is illustrated by the block flow diagram of FIG. 5. The process initiates with the finding of a glyph layer description for the glyph (step 100). The glyph being processed is suitably identified by a glyph id to indicate where the glyph data resides from the glyph layer description 30 in the font. The GLP 12 then accesses the contours specified in the glyph layer description 30 for the glyph layer being processed from the hinted path supplied by the font scaler (step 102) and accesses the layer style for the glyph layer being processed from the layer style description 32 (step 104). Of course, accessing of all the contours suitably occurs when the 'use all contours' indicator has been specified in the glyph data. The glyph layer is then output/rendered (step 106) as a stream or bitmap. The accessing then repeats for a next glyph layer until all the glyph layers for the glyph are processed, as determined via step 108.

Through the present invention, images with intrinsic enhanced features, including color, are provided in the context of a font. Many useful images and graphics could thus be supplied in a familiar form of a font. By way of example, individual country flags could form the glyphs of a font through the implementation of the present invention. By making these images glyphs in a font, several advantages over alternative two-dimensional graphic representations result. For example, the outlines describing the geometries of the image are native font scaler outline data, i.e., TrueType data, and thus can be hinted to optimize their appearance at different sizes on the screen. In conjunction, the ability to apply 3×3 transformation matrices to outline data allows the images to be manipulated in desired manners while preserving the quality of image appearance.

Provision of other types of images as parts of a font through the present invention include icons for rendering in a graphical user interface (GUI). Icons are normally stored as bitmap images that may contain color and are used heavily in such systems by being drawn frequently, thus requiring good performance. As bitmap images, complete renditions of icon suites must be stored to achieve the icons in different sizes. GUI systems thus often limit the number of stored sizes to one or two different sizes. Limits of bitmap scaling further usually result in undesirable icon images, as the icons' images are scaled up or down in size. When provided as part of a font in accordance with the present invention, icons have greater potential for a more significant role in the user interface.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims.

What is claimed is:

1. A method for achieving enhanced glyphs of a font, the method comprising:
   (a) determining a glyph layer description for a selected glyph;
   (b) accessing at least one contour for the selected glyph;
   (c) accessing at least one layer style for the at least one contour of the selected glyph; and
   (d) rendering the selected glyph in accordance with the at least one layer style to produce an enhanced glyph.

2. The method of claim 1 further comprising repeating steps (b), (c), and (d) for each layer of the selected glyph until all layer styles for the selected glyph are rendered.

3. The method of claim 1 wherein rendering further comprises outputting a bitmap of the enhanced glyph.

4. The method of claim 1 wherein rendering further comprises outputting a data stream for the enhanced glyph.

5. The method of claim 4 wherein the data stream corresponds with a curve codec stream format.

6. The method of claim 4 wherein the data stream corresponds with a page description language data stream.

7. The method of claim 1 wherein determining step (a) further comprises identifying the selected glyph from a glyph id.

8. The method of claim 1 wherein accessing step (b) further comprises accessing an appropriate contour from a hinted path of the selected glyph.

9. The method of claim 8 wherein a font scaler provides the hinted path.

10. The method of claim 7 wherein determining step (a) further comprises determining a number of contours associated with the selected glyph, determining one or more contours forming each layer of the selected glyph, and identifying a style of enhancement associated with each layer.

11. The method of claim 10 further comprising providing style of enhancement data in a data structure.

12. The method of claim 11 wherein style of enhancement data comprises basic style data including color, fill type, alpha value, and stroke/fill identification.

13. The method of claim 12 wherein color data comprises device independent color data.

14. The method of claim 12 wherein style of enhancement data further comprises layer style attribute data, the layer style attribute data comprising an extensible set of attributes including a transfer mode, gradient ramp fill, foreground, background and other color options for each layer.

15. A system for achieving enhanced glyphs in a font in a computer system, the system for achieving comprising:

means for providing a hinted path;

a glyph layer processor coupled to the means for providing and receiving the hinted path, the glyph layer processor outputting enhanced glyph data; and a drawing client for receiving the enhanced glyph data from the glyph layer processor for output from the computer system.

16. The system of claim 15 wherein the glyph layer processor processes the hinted path in accordance with data in a glyph layer description, the glyph layer description providing layering specifications for each glyph in the font.

17. The system of claim 16 wherein the layering specifications indicate what layers exist for each glyph and how the existing layers relate to one another.

18. The system of claim 16 wherein the glyph layer description further comprises glyph attributes to apply optional programmed effects for an entire glyph.

19. The system of claim 16 wherein the glyph layer processor further processes the hinted path in accordance with a layer style description one layer at a time, the layer style description storing style characteristics and indexed by the glyph layer description.

20. The system of claim 19 wherein the style characteristics further comprise basic style data, the basic style data including color, fill type, an alpha value, and an identification of a stroke/fill selection.

21. The system of claim 20 wherein the style characteristics further comprise style attribute data, the style attribute data comprising an extensible set of attributes including transfer mode, gradient ramp fill, foreground, background, and other color selection indicators.

22. The system of claim 15 wherein the drawing client comprises a graphics system.

23. The system of claim 15 wherein the drawing client comprises a printer driver.

24. The system of claim 15 wherein the drawing client comprises a glyph server.

25. The system of claim 15 wherein the means for providing a hinted path comprises a font scaler.

26. The system of claim 15 wherein the glyph layer processor outputs enhanced glyph data as a bitmap.

27. The system of claim 15 wherein the glyph layer processor outputs enhanced glyph data as a data stream.

28. The system of claim 27 wherein the data stream comprises a curve codec stream format.

29. The system of claim 27 wherein the data stream comprises a page description language stream.

30. A method for achieving enhanced individual glyphs of a font, the method comprising:

forming a glyph layer description of one or more layers for a font;

forming a layer style description of one or more styles for the font; and utilizing data from the layer style description by the glyph layer description to achieve enhanced glyphs.

31. The method of claim 30 wherein forming a glyph layer description further comprises forming a data structure of layering specifications for the enhanced glyphs of the font.

32. The method of claim 31 wherein the data structure further comprises one or more glyph attributes to apply optional programmed effects for an entire glyph, the glyph attributes including animation commands and parameters.

33. The method of claim 31 wherein the layering specifications indicate what layers exist for each glyph and how the existing layers relate to one another.

34. The method of claim 31 wherein the layering specifications prescribe an order for layer formation of the enhanced glyph.

35. The method of claim 31 wherein the layering specifications indicate one or more contours forming each layer.

36. The method of claim 35 wherein the layering specifications specify use of all contours for the enhanced glyph.

37. The method of claim 30 wherein forming a layer style description further comprises forming a data table of style characteristics, each entry in the data table having a style index value.

38. The method of claim 37 wherein utilizing data from the layer style description further comprises providing the style index value in the glyph layer description.

39. The method of claim 37 wherein forming a data table of style characteristics further comprises providing basic style data for a style, the basic style data comprising color, fill type, an alpha value, and an identification of a stroke/fill selection.

40. The method of claim 39 wherein forming a data table of style characteristics further comprises providing style attribute data, the style attribute data comprising an extensible set of attributes including transfer mode, gradient ramp fill, foreground, background, and other color selection indicators.

* * * * *